United States Patent Office 2,851,408
Patented Sept. 9, 1958

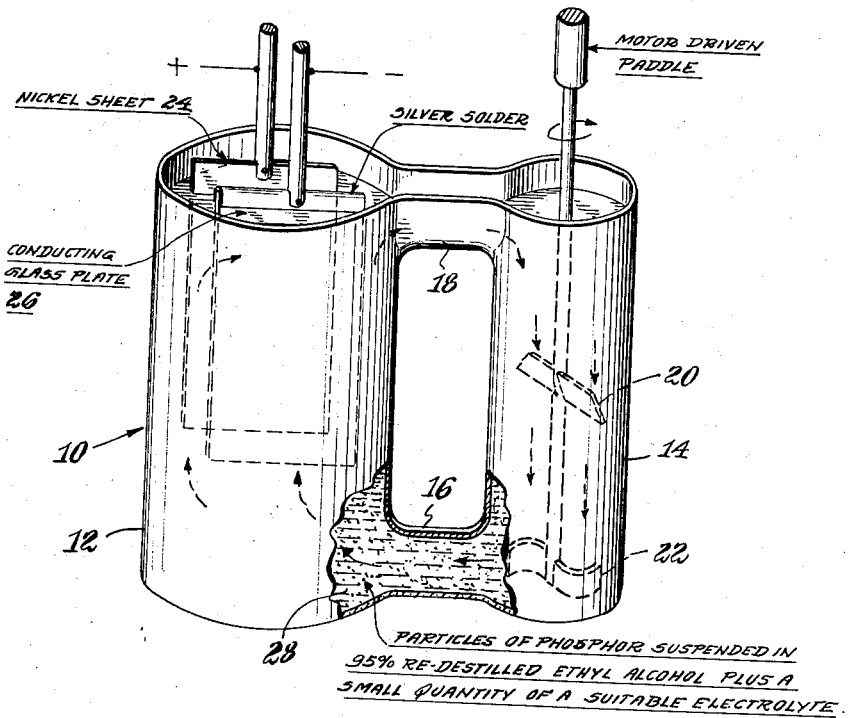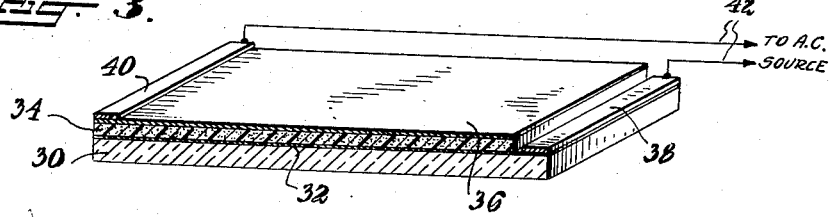

2,851,408

METHOD OF ELECTROPHORETIC DEPOSITION OF LUMINESCENT MATERIALS AND PRODUCT RESULTING THEREFROM

Nicholas F. Cerulli, Caldwell, N. J., assignor to Westinghouse Electric Corporation, East Pittsburgh, Pa., a corporation of Pennsylvania Application October 1, 1954, Serial No. 459,601

3 Claims. (Cl. 204—181)

This invention relates to electrophoretic deposition of luminescent materials and, more particularly, to a process for electrophoretic deposition of luminescent materials to form a thin, even luminescent material layer on a conducting surface for incorporation into an electroluminescent cell, and to the electroluminescent cell resulting therefrom.

Heretofore electroluminescent cells or lamps have been fabricated as outlined in London, Edinburgh & Dublin Philosophical Magazine, Series 7, vol. 38, No. 285, pp. 700–737, article by G. Destriau, entitled New phenomenon of electrophotoluminescence, and as outlined in Patent No. 2,566,349 to Mager. As disclosed by Destriau on page 715 of his article, it is desirable that electroluminescence cells be made very thin in order to obtain maximum fields and thus maximum brightness for the minimum applied voltage. In addition it is well-known in the electroluminescent cell art that the phosphor layers must be made as even as possible in order that the electric field, and thus the brightness, is as uniform as possible. In addition, a very even luminescent material layer minimizes weak points within the cell through which a breakdown of the electric field might occur.

Thin, relatively even layers of luminescent material have been obtained manually in the practices of the prior art, but manual or mechanical methods of providing a thin, even layer of luminescent material leave much to be desired because of the labor involved and the chance of human failure, which is ever present.

It is the general object of the invention to avoid and overcome the foregoing and other difficulties of and objections to prior art practices by the provision of a method of electrophoretically depositing thin, even layers of luminescent material on a conducting surface.

It is a further object to provide an electroluminescent cell having a very thin, even layer of luminescent materials, which layer has been applied by an electrophoretic deposition method.

The aforesaid objects of the invention, and other objects which will become apparent as the description proceeds, are achieved by providing a method for electrophoretic deposition of luminescent materials on a conducting surface wherein an electrolyte is mixed with a suspension of luminescent materials in an alcohol-water medium in order to charge the luminescent particles. The charged luminescent particles are then electrophoretically deposited on a cathode and the electrolyte leached away after deposition. The deposited luminescent material may then be impregnated with a dielectric and thereafter fabricated into an electroluminescent cell by present existing methods.

Electrophoresis may be defined as the motion of charged particles through a suspending medium under the influence of an applied electric field. This effect has been called cataphoresis, but the more general term electrophoresis is now preferred (see Electrical Phenomena at Interfaces, edited by J. A. V. Butler, pages 75 and 76, published by the MacMillan Co., New York, 1951).

In prior art electrophoretic deposition processes, non-ionizable insulating materials such as aluminum oxide have been suspended in a liquid medium along with relatively high concentrations of ionizable salts such as aluminum and magnesium nitrates. These ionizable salts apparently provide the insulating material with an electric charge which enables it to be electrophoretically deposited. After deposition a sufficient quantity of the ionizable salts are present to serve to bond the insulating material to the electrode on which deposition has been effected. After deposition, the ionizable salts are then broken down by the application of heat to form an insulating, non-ionizable material, which results in a substantially homogeneous, insulating coating. Such a procedure is not possible in depositing a layer of luminescent particles, for any foreign substance (i. e., ionizable salts) in the deposited luminescent particles will poison the luminescent characteristics of the deposited luminescent material. It is not possible to convert any deposited ionizable salts to the luminescent materials by the application of heat, for any application of heat will deleteriously affect the luminous output of the luminescent material, which must necessarily be completely processed by firing, ballmilling, etc. as is well known in the art, before the luminescent material is deposited electrophoretically.

In other electrophoretic deposition processes of the prior art, the particles which are to be deposited (for example glass formers) may themselves be charged by mechanical peptization and thus be deposited electrophoretically. It should be noted that charging luminescent particles by mechanical peptization is not practical.

In yet other electrophoretic deposition processes of the prior art, normally non-ionizable materials are given a charge by placing them in a colloidal state in which state they apparently pick up a charge and thus may be deposited electrophoretically. Since the usual luminescent material particles should not be made smaller than about one micron in diameter and are preferably larger, in order to possess good luminescent qualities, a colloidal dispersion of luminescent materials is not practical. Note is made that in a colloidal dispersion the particle size is normally between 1 and 100 millimicrons.

In still another type of electrophoretic deposition, a powder, such as a fluorescent powder, may be made to move to an electrode by virtue of different dielectric constants of the powder and the suspending medium. This phenomenon has sometimes mistakenly been termed cataphoresis, but more correctly may be termed "dielectrophoresis," since the particles deposited are not charged as required by an accurate definition of electrophoresis or cataphoresis. At any rate, the luminescent material particles cannot be deposited evenly in a thin layer by a "dielectrophoretic method" since the deposit will either be negligible or at best non-uniform where a sufficient deposit is obtained.

It has been found that in order to obtain a thin even coating of luminescent material which is deposited by an electrophoretic method, the luminescent particles must be suspended in a medium and charged by means of an ionizable electrolyte. Where an electrolyte is deposited with the luminescent material, however, the material will be contaminated to inhibit its luminescent output unless the electrolyte is removed. Since both the electrolyte and the luminescent material are deposited in the same operation, it was not expected that the deposited electrolyte could later be leached or otherwise removed from the deposited luminescent material without disturbing the continuity of the latter. This was particularly unexpected in view of the fact that where aluminum nitrate and magnesium nitrate served as an electrolyte for alumina, in the prior art practices, the nitrates served as a bonding material to bind the alumina to the surface of the electrode on which it was deposited. In contrast to the expected, however, it was found that the electrolyte could be substantially leached from the luminescent material without disturbing the deposited luminescent material, thus leaving a residue of substantially pure luminescent material in a thin, even continuous coating.

For a better understanding of the invention, reference should be had to the accompanying drawings, wherein:

Fig. 1 is a perspective view of an apparatus, shown partly in section, which may be used to deposit electrophoretically a thin even layer of luminescent material onto a conducting glass plate;

Fig. 2 is a flow chart of the method used in preparing the luminescent particle coated conducting glass plate, which plate may be incorporated into an electroluminescent cell;

Fig. 3 is a perspective view of an electroluminescent cell which incorporates luminescent material deposited electrophoretically in accordance with the teachings of this invention.

Although the principles of the invention are broadly applicable to any electrophoretic deposition of luminescent material onto a conducting surface, the invention has particular application with reference to electroluminescent cells and hence it has been so illustrated and will be so described.

With specific reference to the form of the invention illustrated in the drawing, the numeral 10 indicates generally an apparatus which may be employed to deposit electrophoretically a coating of luminescent particles onto a conducting glass plate. This apparatus comprises a deposition tank 12 and a circulating tank 14, both of which tanks may have a hollow generally cylindrical configuration, and which tanks are connected by fluid passageways 16 and 18 which connect the bottom and the top of the two tanks. The circulating tank 14 is provided with a motor driven paddle arrangement which comprises a first circulating paddle 20 positioned intermediate the ends of the circulating tanks and a second paddle 22 which is positioned adjacent the opening of the bottom fluid passageway in order to drive the circulating fluid into the deposition tank 12.

Contained within the deposition tank are an anode 24, which consists of a nickel sheet and a cathode 26, which consists of a glass plate with a transparent electrically conductive coating over that portion of the cathode which is facing the anode. The anode and cathode are adapted to be connected to a source of D. C. potential and should be substantially parallel to one another and similar in configuration in order that the electric field between the two will be as uniform as possible. For example, the anode and cathode may each have a square configuration and measure two inches on a side. The cathode may consist of a plate of glass having on one face thereof a thin, transparent coating of tin oxide, or other suitable material, and may be prepared by methods as outlined in Patent No. 2,522,531 to Mochel or Patent No. 2,667,428 to Young. Electrical connection to the cathode may be made by silver soldering a strip along one end thereof.

The suspension 28 of luminescent material particles contained in the coating apparatus 10 may be defined broadly as an alcohol-water-electrolyte suspending medium having suspended therein finely divided luminescent particles. The main constituent of the suspending medium is the alcohol and there may exist from 90 to 99 parts by volume of alcohol per 10 to 1 parts by volume of water, the only requirement for the alcohol being that of miscibility with the water in the aforestated proportions. It should be noted that alcohols which may be used are methanol, ethanol, 3-methoxy butanol and isopropanol, for example. The preferred alcohol-water concentration is 95 parts by volume of alcohol per 5 parts by volume of water and the preferred alcohol is 95% redistilled ethyl alcohol.

The small percentage of water present in the suspending medium is desirable to promote solubility and ionization of the electrolyte. Over 10% by volume of water will create a tendency toward excessive electrolysis of the suspending medium with resultant excessive gas formation at the electrodes. Below 1% by volume of water the solubility and ionization of the electrolyte is impaired with resultant impairment of the electrophoretically deposited coating.

As an electrolyte, any electrolyte which is alcohol and water soluble in the aforestated alcohol and water ranges and which contains a polyvalent cation may be used. Thorium nitrate is preferred although alcohol water-soluble salts (for example, nitrates) of zinc, aluminum, nickel and manganese, to name a few, may be used with good results. The proportions of the electrolyte which may be used are $1 \times 10^{-6}$ to $1 \times 10^{-2}$ mole per liter of alcohol and, as an example, $10^{-4}$ mole per liter of alcohol of thorium nitrate may be used as an electrolyte. The optimum concentration for the electrolyte depends upon the total luminescent material particle surface of the suspended luminescent material. However, if the foregoing electrolyte ranges are exceeded at the lower end, the luminescent material deposit will either be negligible or at best non-uniform in nature. If too much electrolyte is used the deposit of luminescent material will be quite rough and irregular and electrolysis of the medium will be excessive.

The concentration of the suspended luminescent particles in the suspending medium may vary from about 0.5 to 10.0 grams of luminescent particles per 100 cc. of suspension with the optimum concentration being from 2 to 3 grams of luminescent particles per 100 cc. of suspension. Below the minimum specified concentration, the deposition is too slow to be practical and above the maximum specified concentration the luminescent particle deposit on the conducting surface is too rough, i. e., the coating thickness will be uneven. The particle size distribution for the luminescent materials may vary between about 1 micron and 40 microns with the optimum range being from 2 microns to 20 microns with 50% or more of the particles ranging in size from 8 to 12 microns. If a majority of particles are overly small, the resultant coatings are too thin and if a majority of the particles are too large the coating will be rough and uneven. Any luminescent material having the foregoing specified particle size distribution may be deposited, the type depending on the intended application. For an electroluminescent cell a zinc sulphide, copper activated, or a zinc sulphide, zinc oxide, copper-activated luminescent material or phosphor may be used. As an example 75% ZnS, 25% ZnO:$10^{-3}$ parts Cu may be used. Any other suitable field-responsive electroluminescent phosphor may be used equally well.

As illustrated in Fig. 1, the coating suspension 28 is continually agitated in order to prevent any settling out of the luminescent material, but it should be noted that the agitation should be of a mild nature and no agitation or circulation of the coating suspension is preferable to a circulation which is too vigorous. An agitation which is insufficient to keep the luminescent particles in complete suspension will result in a coating which is slightly on the thin side, but an overly vigorous agitation of the suspension will deleteriously affect the resulting coating. As an example, the circulation of the suspending medium may be of such nature that the suspending medium in the deposition tank 12 is entirely circulated through the circulating tank 14 once every minute for a cylindrical deposition tank having a diameter of three inches and a heighth of four inches.

The D. C. voltage which is applied to the anode and cathode is governed by the separation between the anode and cathode plates but should be of such magnitude that the voltage gradient between the plates is from 50 to 200 volts per centimeter. If the applied voltage is too low the deposition of the luminescent material particles is too slow and if the applied voltage is too high the suspending medium tends to electrolyze excessively. As a specific example the parallel anode and cathode may be separated by one centimeter and the voltage gradient between the anode and the cathode may be 75 volts.

The time required to attain a deposit of luminescent material may vary greatly, for example, from 10 to 200 seconds or longer, depending upon the luminescent material thickness which is desired. As an example, for an applied voltage of 75 volts, a spacing between electrodes of 1 centimeter and a deposition time of 45 seconds, a coating density of approximately 6 mg. per sq. centimeter of cathode will be obtained for 75% ZnS·25%ZnO:Cu.

The electrolyte will, of course, be present on the cathode along with the luminescent material particles and this electrolyte may be removed from the luminescent material, after the cathode has been removed from the depositing apparatus 10, by soaking the cathode in a solvent consisting of an alcohol-water mixture such as was used as a suspending medium for the luminescent material. A soaking time of 5 minutes has been found to be satisfactory to remove substantially all of the electrolyte and this bath may be repeated two or more times using fresh alcohol-water solvent in order to insure that the deposited luminescent materials are in no way contaminated. During this soaking operation, no loosening or flaking of the deposited phosphor particles has been observed and even though some of the electrolyte (i. e. that which is deposited adjacent the electrode) must traverse the entire thickness of the deposited particle coating in order to be leached out properly, there exists no apparent loosening or discontinuities in the coated phosphor.

After leaching out substantially all of the electrolyte, the phosphor coated electrode is dried in air for example, and the phosphor coating is then impregnated with a suitable dielectric, preferably by immersion in a solvent of the dielectric, for example, a vinyl butyral compound may be dissolved in alcohol and the coated and dried cathode dipped into the alcohol solution of vinyl butyral. When the alcohol solvent evaporates, the plastic will substantially surround the deposited phosphor particles and fill in any spaces therebetween which might constitute breakdown paths when the phosphor and the dielectric coated cathode are incorporated into an electroluminescent cell. As an example of a dielectric-solvent mixture, 1.0 gram of vinyl butyral may be dissolved in 100 cc. of ethyl alcohol. It will be obvious that other suitable plastics such as methyl methacrylate and polystyrene may be used as well as any other suitable plastic which has a relatively high dielectric constant and which may readily be dissolved in a solvent therefor to facilitate its application to the phosphor coated cathode of this invention. It should be understood that where an electroluminescent cell application is involved, the dielectric preferably is light-transparent.

In Fig. 3 is illustrated an electroluminescent cell which incorporates the electrophoretically deposited luminescent material of this invention and which cell comprises a backing plate 30 carrying thereon a thin transparent conducting layer of tin oxide 32, phosphor embedded dielectric 34 coated over the transparent conducting layer 32, second electrode 36 coated over the phosphor-dielectric, transparent conducting electrode bus bar 38, second electrode bus bar 40 and suitable electrical connections 42 which connect the bus bars to a source of A. C. potential.

In fabricating such a cell as illustrated in Fig. 3, the cathode 26 carrying the phosphor dielectric is first completely dried, by air-drying for example. A portion of the phosphor-dielectric is then removed from one end of the cathode so that a copper bus bar may be attached to the thin transparent conducting layer 32 in order to facilitate electrical connection. Such a bus bar may be applied as outlined in Patent No. 2,628,299 to Gaiser. This bus bar 38 and a small section of the phosphor-dielectric layer 34 are masked and the remainder of the exposed surface of the phosphor-dielectric may be coated with a thin layer of aluminum, for example, by well-known vacuum metallizing techniques. A second bus bar 40 is then attached to the second electrode 36, by a method as outlined in the aforementioned Gaiser patent, for example. Suitable electrical connections 42 may then be soldered to the bus bars to facilitate electrical connection of the electroluminescent cell electrodes. Upon removal of the mask over the first busbar and small portion of the phosphor-dielectric, the cell will be ready for operation. It should be readily obvious that the vacuum-metallized electrode may be replaced by a second thin transparent electrode applied to a transparent backing plate, if it is desired that both faces of the electroluminescent cell be transparent. Also, the phosphor may be electrophoretically deposited directly onto a metallic cathode, if desired.

It will be recognized that the objects of the invention have been achieved by providing a method for electrophoretically depositing thin, even layers of luminescent material onto a conducting surface, thereafter removing the electrolyte by leaching in a solvent. In addition there has been provided an electroluminescent cell incorporating a very thin, even layer of luminescent materials, which layer has been applied by an electrophoretic deposition method.

As a possible alternative embodiment, the thin even layer of electrophoretically deposited luminescent material may be used in other applications where the same general requirements of thinness and evenness are present, such as in cathode ray tubes and fluorescent lamps. In such applications, the deposited phosphor would normally not be impregnated with a dielectric before being incorporated into the finished unit.

While in accordance with the patent statutes, one best known embodiment has been illustrated and described in detail, it is to be particularly understood that the invention is not limited thereto or thereby.

I claim:

1. The method of forming a thin even layer of electric-field-responsive luminescent particles on an electrically conducting surface comprising, forming an alcohol-water-electrolyte suspending medium consisting of 1–10 parts by volume of water, 99–90 parts by volume of an alcohol which is miscible with water in the aforestated alcohol-water ranges, and $1 \times 10^{-6}$ to $1 \times 10^{-2}$ moles per liter of said alcohol of an electrolyte which is alcohol and water soluble in the aforestated water-alcohol ranges and which contains a polyvalent cation, forming a suspension of a finely-divided luminescent material ranging in particle size distribution from about 1 micron to 40 microns in said medium in the proportions of 0.5 to 10 grams of luminescent material per 100 cc. of said suspension, placing a substantially parallel and similarly conformed anode and cathode in said suspension while maintaining same, applying a voltage having a gradient of from 50 to 200 volts/cm. between said anode and said cathode for a sufficient time to deposit a luminescent material and electrolyte coating of the desired thickness on said cathode, and leaching out the deposited electrolyte while leaving the deposited luminescent material intact.

2. The method of forming a thin even layer of electric-field-responsive luminescent particles on an electrically-conducting surface comprising, forming an alcohol-water-electrolyte suspending medium consisting of 5 parts by volume of water, 95 parts by volume of ethyl alcohol and $1 \times 10^{-6}$ to $1 \times 10^{-2}$ moles per liter of said alcohol of an electrolyte which is alcohol and water soluble in the aforestated water-alcohol ranges and which contains a polyvalent cation, forming a suspension of a finely-divided luminescent material ranging in particle size distribution from about 1 micron to 40 microns in said medium in the proportions of 0.5 to 10 grams of luminescent material per 100 cc. of said suspension, placing a substantially parallel and similarly conformed anode and cathode in said suspension while maintaining same, applying a voltage having a gradient of from 50 to 200 volts/cm. between said anode and said cathode for a sufficient time to deposit a luminescent material and electrolyte coating of the desired thickness on said cathode, and leaching out the deposited electrolyte while leaving the deposited luminescent material intact.

3. The method of forming a dielectric-impregnated thin even layer of electric-field-responsive luminescent particles on an electrically-conducting surface for use in an electroluminescent cell comprising, forming an alcohol-water-electrolyte suspending medium consisting of 1-10 parts by volume of water, 99-90 parts by volume of an alcohol which is miscible with water in the aforestated alcohol-water ranges, and $1 \times 10^{-6}$ to $1 \times 10^{-2}$ moles per liter of said alcohol of an electrolyte which is alcohol and water soluble in the aforestated water-alcohol ranges and which contains a polyvalent cation, forming a suspension of a finely-divided field-responsive luminescent material ranging in particle size distribution from about 1 micron to 40 microns in said medium in the proportions of 0.5 to 10 grams of luminescent material per 100 cc. of said suspension, placing a substantially parallel and similarly conformed anode and light-transmitting cathode in said suspension while maintaining same, applying a voltage having a gradient of from 50 to 200 volts/cm. between said anode and said cathode for a sufficient time to deposit a luminescent material and electrolyte coating of the desired thickness on said cathode, leaching out the deposited electrolyte while leaving the deposited luminescent material intact, drying said electrolyte-leached, deposited luminescent material, and impregnating said dried luminescent material with a light-transmitting dielectric material to fill any voids therein.

References Cited in the file of this patent

UNITED STATES PATENTS

| | | |
|---|---|---|
| 2,552,535 | Santis | May 15, 1951 |
| 2,566,349 | Mager | Sept. 4, 1951 |
| 2,678,888 | Evans | May 18, 1954 |
| 2,698,258 | McGraw et al. | Dec. 28, 1954 |

FOREIGN PATENTS

| | | |
|---|---|---|
| 444,723 | Great Britain | Mar. 26, 1936 |
| 655,032 | Great Britain | July 11, 1951 |
| 670,079 | Great Britain | Apr. 16, 1952 |
| 691,859 | Great Britain | May 20, 1953 |